Figure 6:
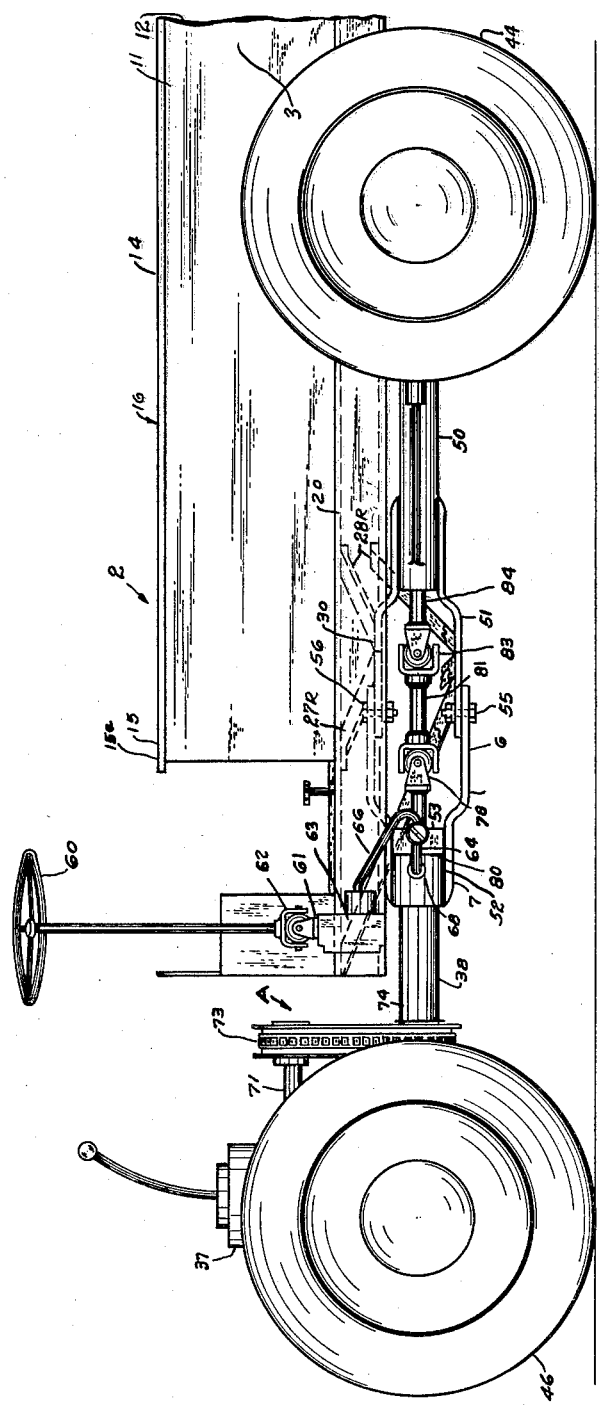

July 24, 1962 C. S. HADLOCK 3,045,774
AUTOMOTIVE VEHICLE
Filed March 6, 1961 3 Sheets-Sheet 1
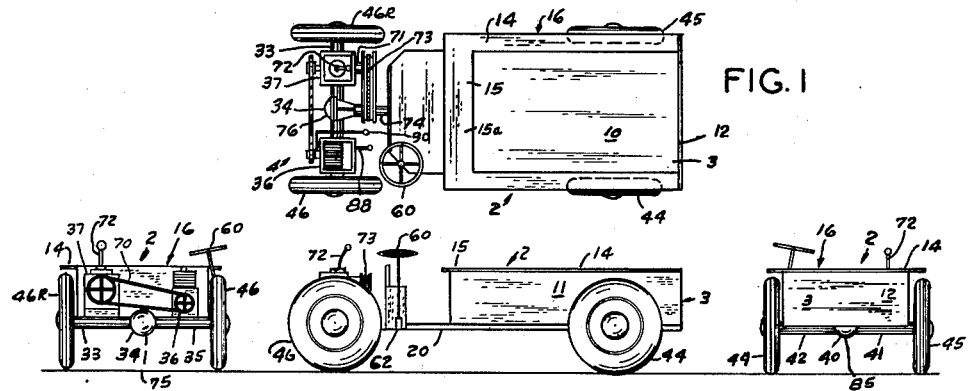
FIG. 1
FIG. 3  FIG. 2  FIG. 4
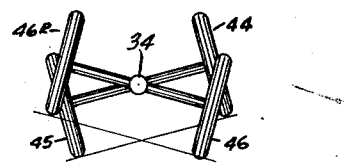
FIG. 8
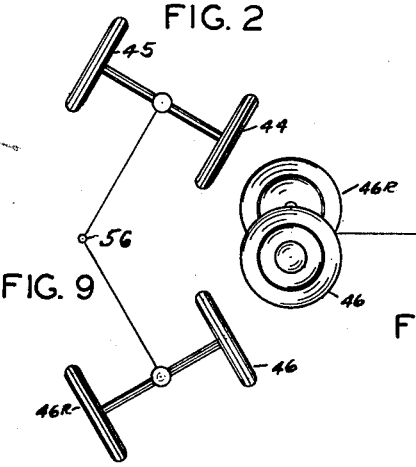
FIG. 9
FIG. 10
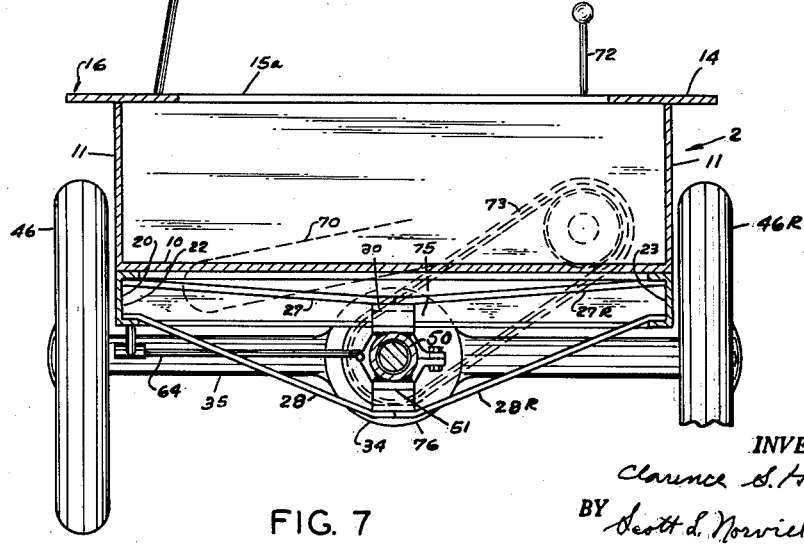
FIG. 7
INVENTOR.
Clarence S. Hadlock
BY Scott L. Norvell
atty

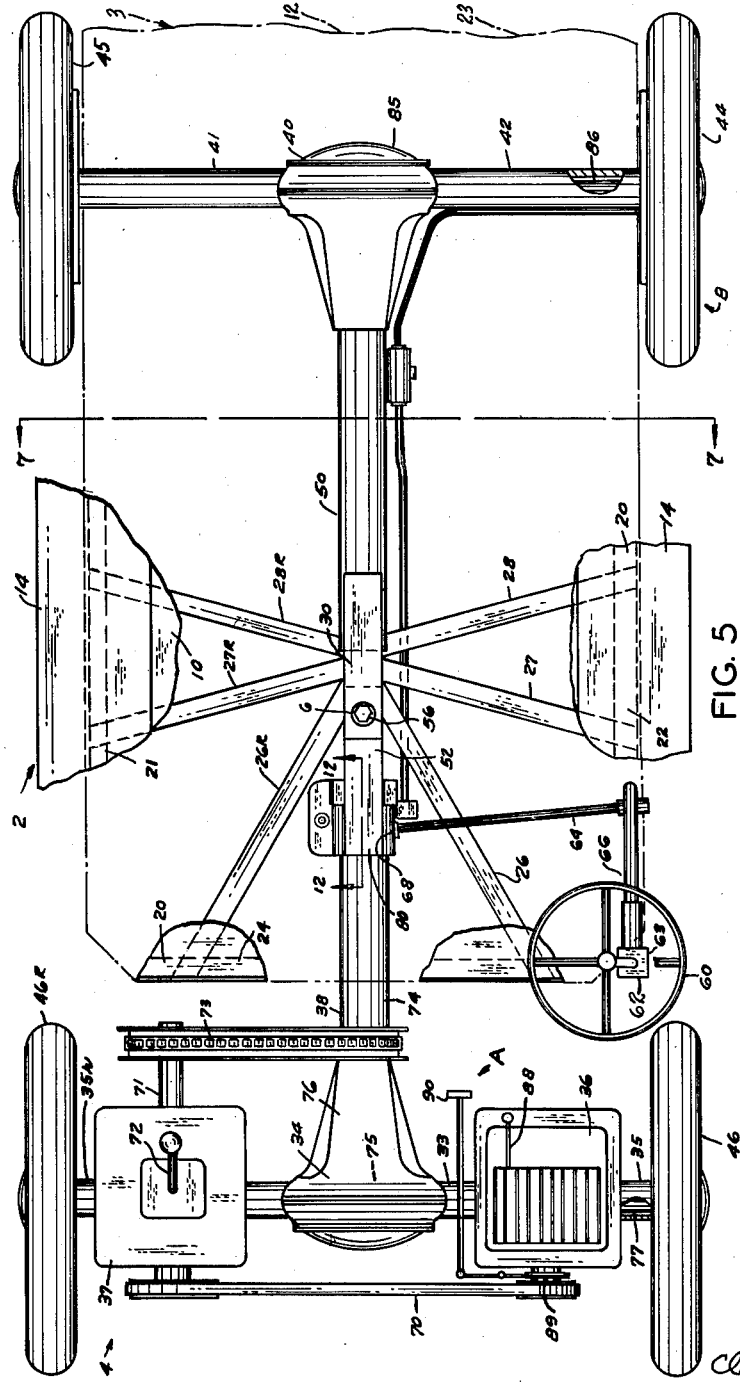

July 24, 1962

C. S. HADLOCK 3,045,774

AUTOMOTIVE VEHICLE

Filed March 6, 1961

3 Sheets-Sheet 3

INVENTOR.
Clarence S. Hadlock
BY Scott L. Norvell
atty

United States Patent Office 3,045,774
Patented July 24, 1962

3,045,774
AUTOMOTIVE VEHICLE
Clarence S. Hadlock, Mesa, Ariz., assignor, by mesne assignments, to DynaCo Manufacturing, Inc., a corporation of Arizona
Filed Mar. 6, 1961, Ser. No. 93,542
1 Claim. (Cl. 180—51)

This invention pertains to an automotive vehicle for rugged terrain.

One of the objects of the invention is to provide a self-propelled vehicle which will travel at a fairly rapid speed over very rugged ground, including rocks and sharp depressions and creeks or other irregularities and carry a load of one man or several together with equipment of several hundred pounds.

Another object is to provide a self-propelled vehicle which can be maneuvered over extremely rough terrain and which will adapt itself to the terrain either by adjusting the axis of the front and rear axles to varying angles or by moving the front body part with reference to the rear body part so that the wheels at all times remain on the ground and in riding position.

Still another object is to provide a vehicle as above stated wherein an engine of comparatively small horsepower can be used to propel the vehicle and carry men and loads over rough terrain at a moderate speed.

Still another object is to provide a vehicle, as above stated, which can be easily steered and maneuvered without the use of knuckle joints at the ends of either the front or rear axle.

Still another object is to provide a vehicle of the type stated wherein the propulsion is attained by having all four wheels drive and wherein the driving position is maintained regardless of the roughness of the terrain and the cramped positions in which the wheels may be forced.

I attain the foregoing objects by means of the structure, parts and combinations of parts and structure shown in the accompanying drawings, in which—

FIGURE 1 is a plan view of the vehicle;
FIGURE 2 is a side view thereof;
FIGURE 3 is a front elevational view thereof;
FIGURE 4 is a rear elevational view thereof;
FIGURE 5 is a plan view of the vehicle with the upper parts and floor partially removed to show the working parts and drawn on a greatly enlarged scale;
FIGURE 6 is a side elevational view of the vehicle as shown in FIGURE 5;
FIGURE 7 is a sectional elevational view of the device, as shown in FIGURE 5 with the section taken substantially on line 7—7 of FIGURE 5;
FIGURE 8 is a semi-diagrammatic view showing the relative movements of the wheels and axles as made when going over rough terrain;
FIGURE 9 is a plan view showing relative movements of the wheels and axles illustrating maneuverability;
FIGURE 10 is a semi-diagrammatic elevational view showing relative movement of the wheels and axles used in attaining maneuverability;
FIGURE 11 is a vertical sectional view of a forward drive shaft coupling; and
FIGURE 12 is a section taken on line 12—12 of FIGURE 11.

Similar numerals refer to similar parts in the several views.

The body of the vehicle, generally indicated by numeral 2, is composed of a rear part 3 and a fore part 4. These two parts each have their own axles and are joined structurally by a double clevis joint 6 (see FIGURE 6) which permits horizontal bending and a rotary joint 7 which permits relative rotary movement.

The rear portion 3 is provided with a floor 10 from which sides 11 and back 12 extend upward. At the upper edges of the sides and back, padded seats 14 may be provided. A cross seat 15 is provided at the front end of the box-like body structure 16.

The floor continues forward of the body and is diminished in width somewhat at the forward end. This floor is attached to a frame 20 which includes side, back and front channel members 21, 22, 23 and 24. These members are braced by diagonal brace members 26 and 26r, 27 and 27r, and 28 and 28r. These diagonal members extend fan-wise from a central body member 30 and connect the frame to this member at various points, respectively.

The front body portion 4 is built substantially on the transverse axle housing 33. This axle housing is centrally connected to the front differential housing 34. The left axle housing part 35 is connected to and supports an engine 36 and the right axle housing supports a transmission case 37.

From the front universal case 34 a drive tube housing 38 extends rearward. Beneath the floor 10 of the rear body part 3 there is a rear differential housing 40. Axle housings 41 and 42 extend outward from this housing and axles within the axle housings carry rear left wheel 44 and right wheel 45.

At the front the drive shaft within the front axle housing 35 carries left front wheel 46 while the right hand front axle housing 35r carries a front axle drive shaft on which is mounted right front wheel 46r.

From the rear differential case 40 a rear drive shaft housing 50 extends forward to and is welded to a rear clevis portion 51 of the central coupling 6. The forward axle housing 38 extends rearward and is threaded into the nut portion 53 of the forward clevis portion 52 of the central connecting joint 6. It will be noted that the housings for the two drive shaft parts 38 and 50 are stationary and do not move relative to their respective body portions. Each terminates in a clevis part and the two clevis parts are joined by a bottom clevis bearing bolt 55 and a top clevis bearing bolt 56. This structure just described permits the front and rear body part to swing left and right relative to each other, as shown in the diagram, FIGURE 9. The threaded bearing portion 53 of the forward clevis part 52 permits the forward part 4 of the vehicle to twist relative to the rear part as is shown particularly in the diagram FIGURE 8.

Steering of the vehicle as a whole is accompanied by varying the horizontal angle between the forward and aft body parts, as shown in diagram FIGURE 9. For this reason there is no need for conventional steering knuckles between the ends of the forward transverse drive shaft and the wheels supported by the shafts within the housings at the forward end.

To control the angle between the two body parts which, in turn, controls the angle between the two drive shafts 38 and 50, I provide a steering wheel 60 which turns a steering shaft 61 through a universal joint 62 and gearing contained within case 63. This controls a connecting rod 64. Since the gearing 63 and other parts of the steering mechanism are fastened to the forward left hand edge of the floor portion 10 of the body part 3, motion of the arm 66 protruding from the steering gear box 63 controls connecting link 64 which is connected at its inner end to the forward portion 52 of the central joint 6. The connection is indicated by numeral 68.

Drive is accomplished by engine 36 which is connected through belt 70 to the fore support transmission of standard design to a power out shaft 71.

The transmission is controlled by the shift lever 72 which can be controlled from the fore part of the vehicle body 15.

A chain 73 transmits power from the transmission shaft 71 to a drive shaft 74 on the forward body part A. This shaft drives the front wheels 46 and 46r through differential gears 75 in gear case 76. The gears 75 transmit power to the front drive shaft 77 which operates transversely in the front body part A. Each of the forward wheels 46 and 46r are keyed directly to the respective ends of the forward drive shaft.

The forward drive shaft 74 extends rearward to a forward universal joint 78. This joint is adjacent a drive shaft bearing in the forward shaft housing 80. The drive shaft 78 rotates a short shaft 81 which is disposed so that its middle alignment is with the center line of the pivot bearing bolts 55 and 56. At the rear of the stub shaft there is a second or rear universal joint 83. This joint drives the rear drive shaft 84, which operates within the housing 50. This rear drive shaft extends into the rear differential housing 85 and through conventional gearing drives a solid rear shaft 86. The rear wheels 44 and 44r are keyed directly to the ends of drive shaft 86. It is to be understood that the differential gearing used is conventional and well known to automotive practice and that the two right and left parts of the axle operate to transmit power to the respective right and left rear drive wheels.

The engine 36 is provided with a throttle and throttle control 88 positioned within easy reach of the seat portion 15a. The clutch 89 is operated by the clutch lever 90.

From the foregoing it is to be understood that I have provided an automotive body which consists of two parts, a fore part A and a rear part B. These two parts are connected centrally by the pivot yoke 6 previously described. Power is transmitted from an engine positioned in the forward part A through a clutch and transmission gearing to the fore part of a drive shaft contained within housing 38. This is in turn transmitted to the forward wheels through a differential and the drive shaft after driving a double universal joint, including the forward part 78 and rear part 83, to a rear central drive shaft contained in the housing 50 and from this the power is transmitted through a differential to the two rear wheels. Steering is accomplished by varying the angle of the axis of the forward drive shaft relative to the axis of the rear drive shaft. In other words, the body part A pivots relative to the body part B on a horizontal plane. This permits old usual steering. Rough terrain, when encountered, will tend to move the body parts into various angles wherein the forward and rear axles operate in different planes. This is accomplished by the joint shown in FIGURE 11. The forward body part is supported by the threaded screw part 38, which is rotatively connected to the internally threaded part 53 and this is in turn attached to the yoke parts 52 which extend rearwardly to the pivot pins 55 and 56. This threaded connection acts as both a rotary bearing and as a longitudinal adjustment to vary the longitudinal distance between parts A and B.

When the angle of the front axle varies relative to the rear axle in a horizontal plane the rotary joint 92 consisting of the parts 52 and 53 permits this twisting adjustment and in this way the vehicle as a whole may be adjusted as shown in FIGURES 8 and 10.

During all motions of varying angle between the two shafts drive is continued. That is the front wheels continue to drive as well as the back wheels. The forward and rear differentials allow for steering adjustment and the direction of movement is controlled by the varying angle of the forward and rear axles as controlled by the steering wheel and as illustrated diagrammatically in FIGURE 9. With this combination of adjustments the vehicle is able to travel over very rough terrain wherein the drive wheels are required to seek their own level each regardless of the level of the opposite body part.

To prevent the forward body part from rotating under applied power when the wheels may be temporarily locked I employ rather large tires on the forward wheels and these are partially filled with water to act as weights and to assist in obtaining traction. At the same time these weighted tires prevent rotation of the front axles with reference to the rear axle when rotation of the wheels is blocked or partially blocked.

I claim:

An automotive vehicle for operating over rugged terrain comprising a forward body part supported by wheels mounted on transverse aligned axles centrally joined by differential gearing and a central fore and aft drive shaft connected by gears to said forward differential, a differential gear housing and a housing for said axle parts and a housing for said drive shaft, an engine mounted on said axle housing having a clutch and belt means driving a gear change mechanism contained in a box, said gear change box being mounted on said axle housing and a chain mechanism connecting said gear change mechanism with said forward drive shaft, a rear body part including right and left axle parts connected by differential gearing, and a drive shaft connected by gears to said rear differential gearing, a tubular axle housing enclosing said rear axle parts and a differential housing connecting said axle housing tubing centrally of said housing, a tubular drive shaft housing connected to said differential housing, a pivot joint joining the front axle housing to said rear axle housing, including two mutually interfitting clevis parts pivotally joined by vertical bearing bolts, a tubular universal joint operatively joining the front drive shaft to the rear drive shaft, a platform on said rear drive shaft housing having a seat and a steering wheel including a steering arm driven through gearing by said steering wheel, said gearing being mounted on said platform, a steering link connecting said forward drive shaft housing to said steering arm at a point eccentric to said vertical pivot bearing bolts, and means for controlling operation of said engine from said seat and for operating said clutch and gear shift mechanism from said seat.

References Cited in the file of this patent

UNITED STATES PATENTS

| | | |
|---|---|---|
| 2,391,971 | Hollos | Jan. 1, 1946 |
| 2,827,715 | Wagner | Mar. 25, 1958 |
| 2,884,083 | McColl | Apr. 28, 1959 |

UNITED STATES PATENT OFFICE
CERTIFICATE OF CORRECTION

Patent No. 3,045,774                                July 24, 1962

Clarence S. Hadlock

It is hereby certified that error appears in the above numbered patent requiring correction and that the said Letters Patent should read as corrected below.

In the drawing, Sheet 2, "FIG. 5, section line 12-12 is in error and should be considered eradicated.; column 4, line 43, for "tubular" read -- double --.

Signed and sealed this 8th day of September 1964.

(SEAL)
Attest:

ERNEST W. SWIDER
Attesting Officer

EDWARD J. BRENNER
Commissioner of Patents